April 24, 1962 J. J. WHITE ETAL 3,030,695
RIVETING MACHINE
Filed April 18, 1958 13 Sheets-Sheet 1

INVENTORS
JOHN J. WHITE
MILTON CLAR
ATTORNEY

April 24, 1962

J. J. WHITE ETAL 3,030,695

RIVETING MACHINE

Filed April 18, 1958

INVENTORS
JOHN J. WHITE
MILTON CLAR

BY

ATTORNEY

April 24, 1962

J. J. WHITE ETAL 3,030,695

RIVETING MACHINE

Filed April 18, 1958

INVENTORS
JOHN J. WHITE
MILTON CLAR

BY

ATTORNEY

April 24, 1962

J. J. WHITE ET AL
RIVETING MACHINE 3,030,695

Filed April 18, 1958

INVENTORS
JOHN J. WHITE
MILTON CLAR

BY

ATTORNEY

April 24, 1962

J. J. WHITE ETAL
RIVETING MACHINE 3,030,695

Filed April 18, 1958

INVENTORS
JOHN J. WHITE
MILTON CLAR

BY *S. Frederick Namann*

ATTORNEY

INVENTORS
JOHN J. WHITE
MILTON CLAR

April 24, 1962   J. J. WHITE ETAL   3,030,695
RIVETING MACHINE

Filed April 18, 1958

INVENTORS
JOHN J. WHITE
MILTON CLAR
BY

ATTORNEY

INVENTORS
JOHN J. WHITE
MILTON CLAR

United States Patent Office 3,030,695
Patented Apr. 24, 1962

3,030,695
RIVETING MACHINE
John J. White, Bethesda, Md., and Milton Clar, Washington, D.C., assignors to ACF Industries, Incorporated, New York, N.Y., a corporation of New York
Filed Apr. 18, 1958, Ser. No. 729,463
3 Claims. (Cl. 29—26)

This invention relates to riveting machines and, more particularly, to automatic riveting machines adapted for use in assembling aircraft wings and similar structures wherein the several components thereof are to be rapidly secured together by means of numerous rivets. This application is a continuation in part of application Ser. No. 717,934, filed February 27, 1958 in the name of Milton Clar, now Patent No. 2,978,791 issued April 11, 1961.

Briefly, the present invention contemplates the provision of an automatic riveting machine comprising work clamping means, drilling and countersinking means, rivet slug selection and inserting means, heading means, and rivet head trimming means.

An object of the invention resides in the provision of a machine adapted to reduce the cost of fabrication of aircraft wings and similar structures having their several structural parts secured together by rows of rivets.

Another object of the invention resides in the provision of a clamping arm which co-acts with a supporting head to clamp workpieces in fixed position during the several operations involved in applying a rivet thereto and finishing the head of the rivet.

A further object of the invention resides in the provision of an upper head piston which co-acts with a drill spindle and a heading plunger to drill and countersink a hole in workpieces, insert a slug in the hole, and then head one end of the slug while an anvil is heading the other end of the slug.

Another object of the invention resides in the provision of a cutter which is supported on and guided along the work clamping arm to trim a rivet head flush with the adjacent surface of a workpiece.

Another object of the invention resides in the provision of means for rotating the supporting head and anvil 180° to facilitate riveting of structural components of different shapes.

The invention embodies other novel features, details of construction, and arrangement of parts which are hereinafter set forth in the specification and claims and illustrated in the accompanying drawings, forming part thereof, wherein:

FIG. 6 is a section illustrating the supporting head and anvil assembly.

Referring now to the drawings for a better understanding of the invention, the riveting machine is shown as comprising a drop-throat C-type frame 2 having an upper head 3 vertically spaced from a lower head 4 to receive work pieces A and B therebetween.

Figure 1:
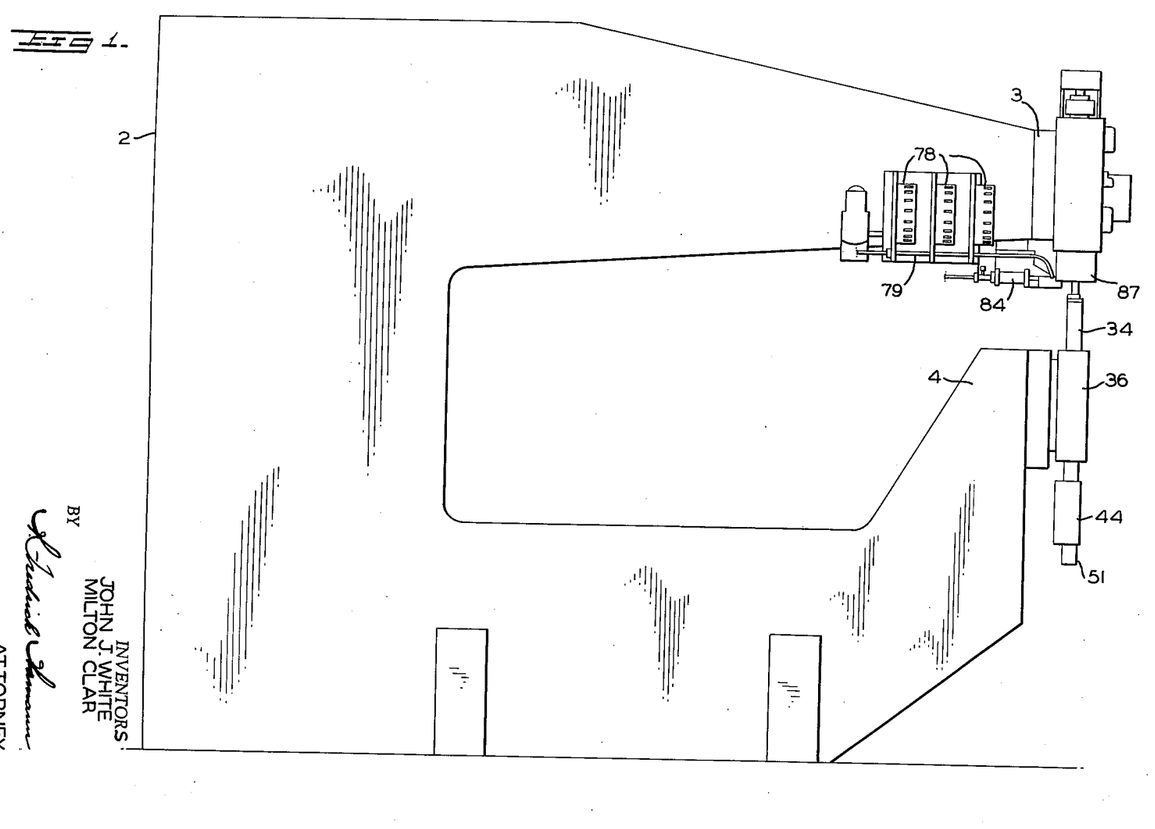
FIG. 1 is a side elevation illustrating a riveting machine embodying features of the invention.
Figure 2:
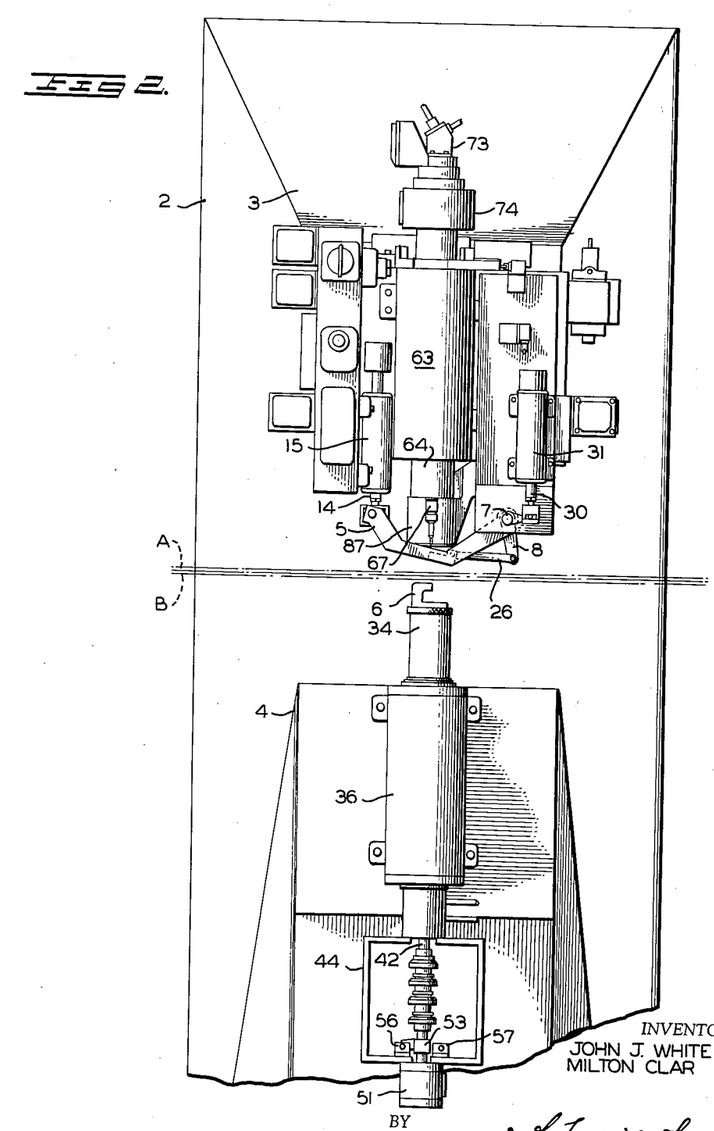
FIG. 2 is a front elevation of the machine.
Figure 3:
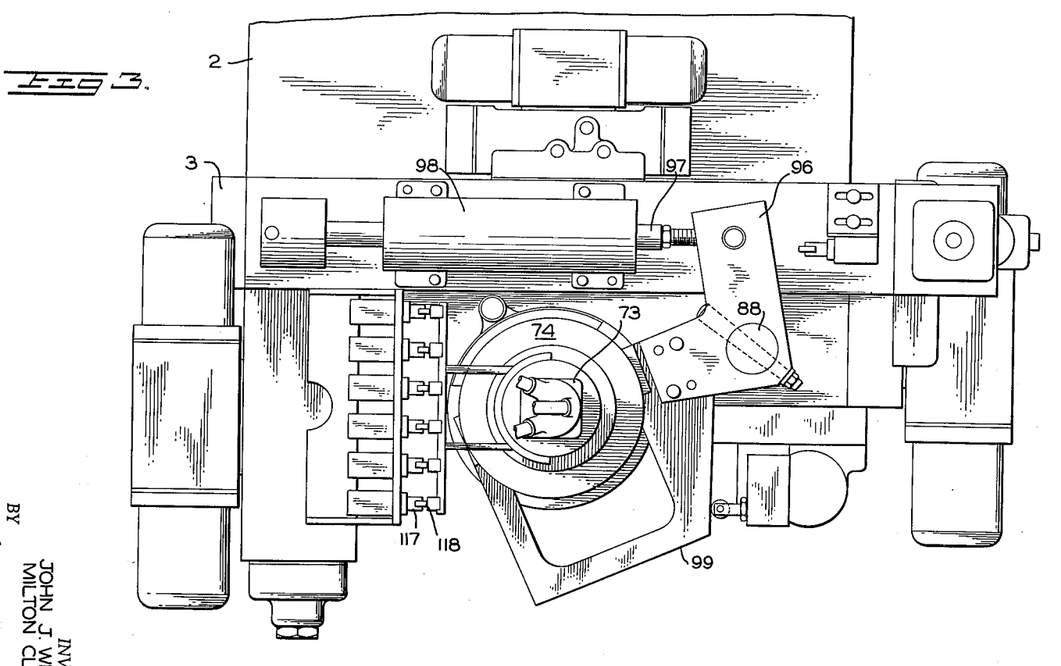
FIG. 3 is a fragmentary plan view of the machine.
Figures 4, 5:
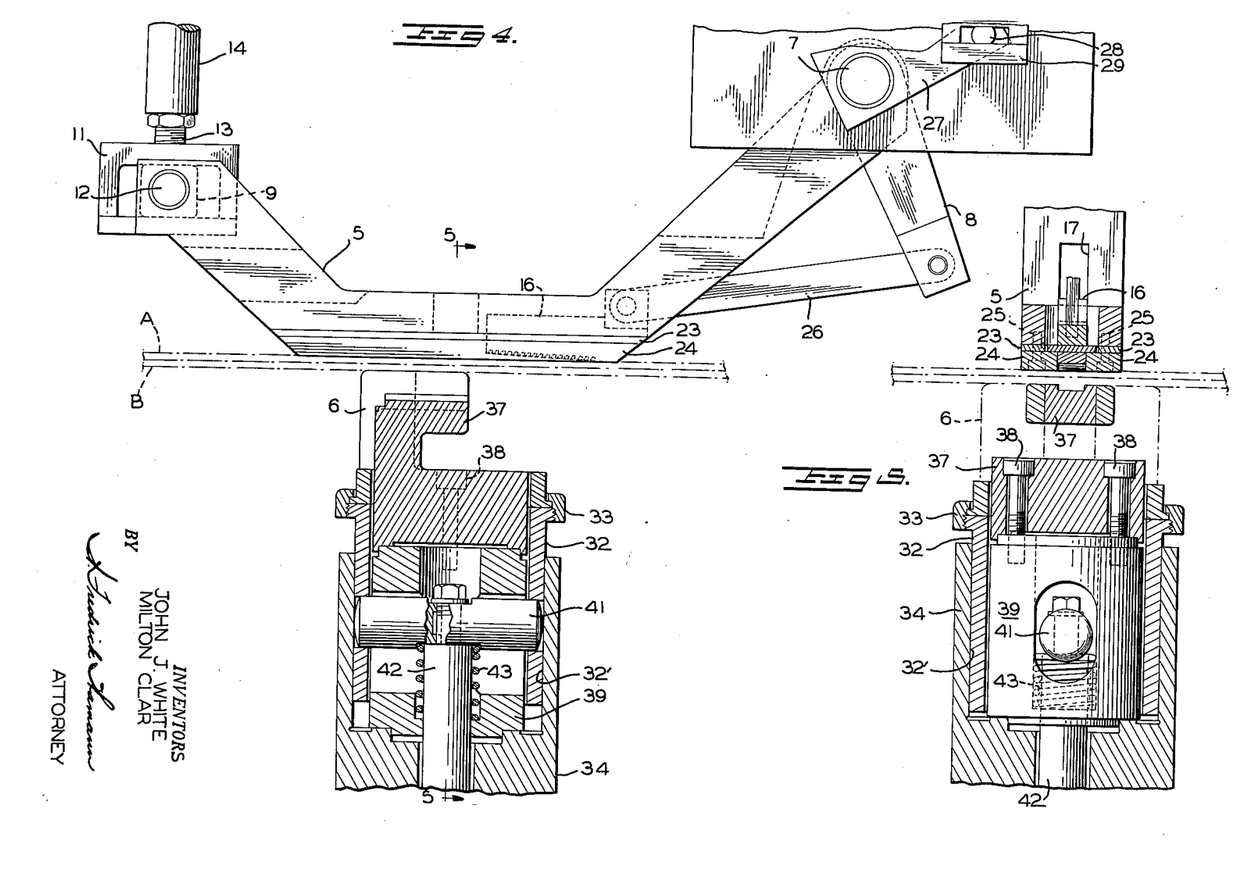
FIG. 4 is a fragmentary front elevation, partly in section, illustrating workpieces clamped between a clamping arm and a supporting head.
FIG. 5 is a transverse section taken along the line 5—5 of FIG. 4.
Figure 5:
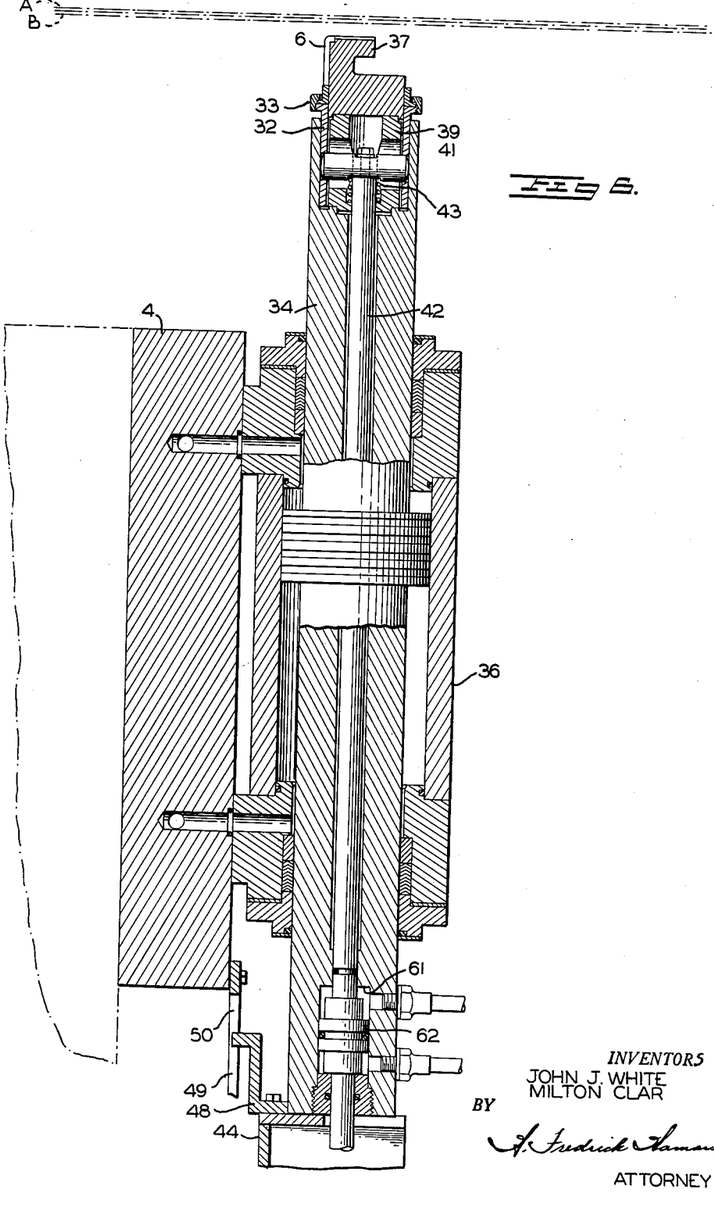

To secure the workpieces A and B in fixed position during each riveting operation, the machine is provided with a work clamping arm 5 adapted to clamp the workpieces against a supporting head 6. As illustrated in FIG. 4, one end of the arm is pivotally mounted on a pivot pin 7, said end being bifurcated to straddle a cutter actuating lever 8 which is secured to the pivot pin. The other end of the arm 5 is also bifurcated to straddle a block 9 slidably mounted in a bearing 11, said block being mounted on a pivot in 12 journaled at its ends on the arm. The slide bearing 11 is formed with a boss 13 threaded into the lower end of a piston 14 to permit adjustment of the arm 5 relative to the piston, the boss having a lock nut thereon to lock the boss and piston against relative movement. The piston 14 is mounted in a cylinder 15 mounted on the upper head 3.

Figures 16, 17, 18, 21, 22:
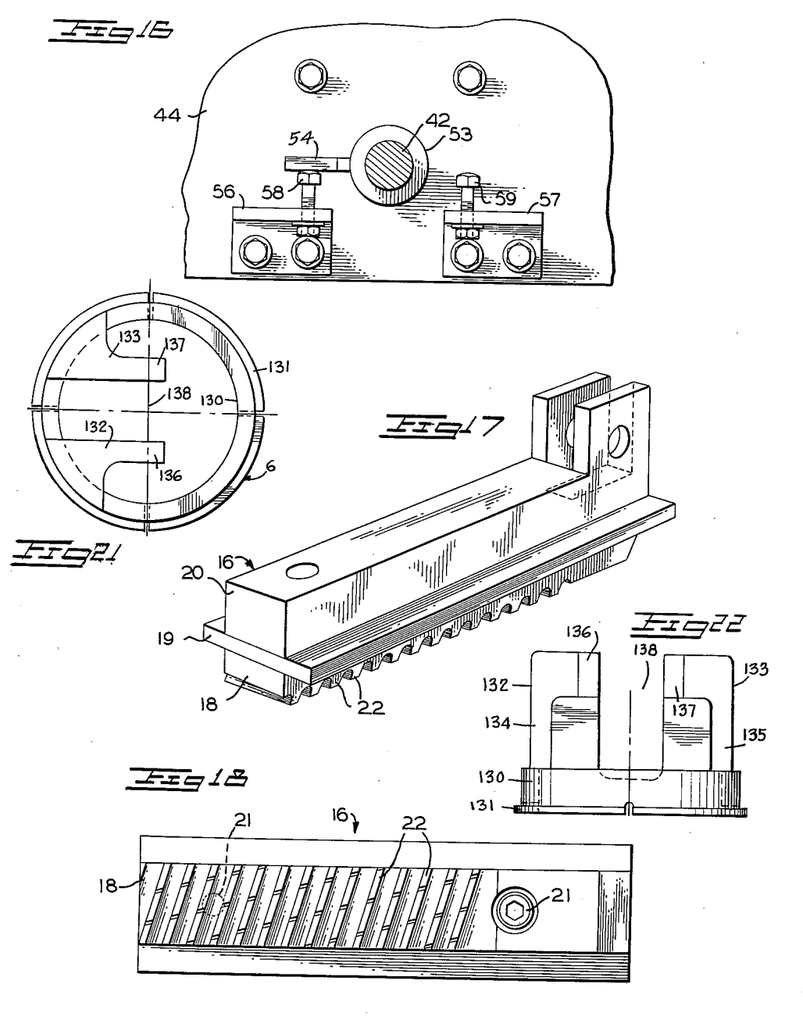
FIG. 16 is a detail sectional view taken along the line 16—16 of FIG. 7.
FIG. 17 is a detail perspective view showing the cutter for trimming rivet heads.
FIG. 18 is a bottom view of same.
FIG. 21 is a top view and FIGURE 22 is a side view of the work supporting head.

A cutter 16, mounted for reciprocative movement within a slot 17 formed in the arm 5, is shown as comprising a blade 18 secured to a guide plate 19 and backing plate 20 by screws 21, the blade having a plurality of teeth 22 of progressively increasing length to act successively in trimming excess metal from the head of a rivet. Spacing strips 23—23 and retainer strips 24—24 are secured to the arm 5 by screws 25 to define opposing grooves to slidably receive the side edges of the guide plate 19. The backing plate 20 and actuating lever 8 are interconnected by a link 26. A lever 27 is fixed on the pivot pin 7 and provided with a pin 28 engaged in a slide bearing 29, said bearing having a shank threaded into a piston 30 and locked thereto by a lock nut. The piston 30 is mounted in a cylinder 31 secured to the upper head 3.

The supporting head 6 is detachably secured to the upper end of a cylindrical sleeve 32 by means of a threaded locking collar 33 to permit replacement or rotational adjustment of the head. The sleeve 32 is journaled for rotational and axial movement in a cylindrical bore 32' formed in the upper end of an anvil piston 34 mounted in a cylinder 36 secured to the lower head 4. An anvil head 37 is secured by means of cap screws 38 to an anvil support 39 mounted within the sleeve 32 in abutting engagement against the anvil piston 34, said sleeve and support being formed with apertures to receive a cross rod 41 keyed to the upper end of a piston rod 42.

A compression spring 43 is interposed between the anvil support 39 and the cross rod 41 to maintain the support in seated engagement against the anvil piston 34.

A housing 44 is secured to the lower end of the anvil piston 34 to support a plurality of switches 46 for engagement by cam members 47 secured on the lower end of the piston rod 42. A guide bracket 48 is secured to the housing 44 and provided with an offset end for vertical sliding engagement in a slot 49 formed in a guide track 50 secured to the head 4, to thereby prevent rotational movement of the anvil piston 34 relative to the head 4.

Figure 7:
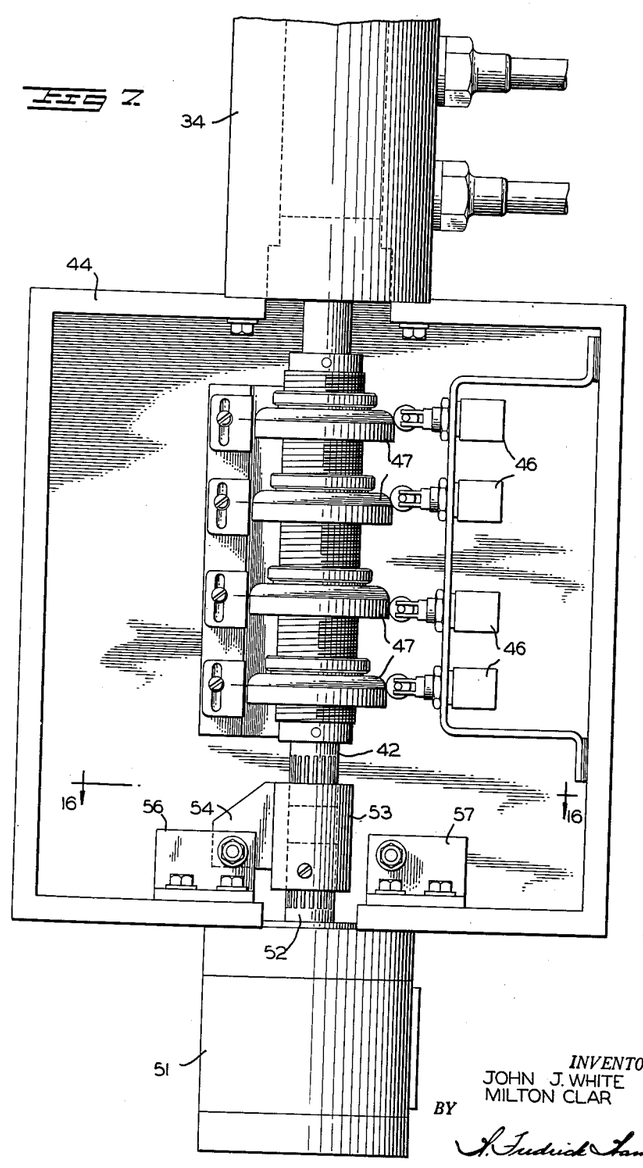
FIG. 7 is a fragmentary front elevation showing the supporting head rotating means.

A conventional vane type hydraulic motor 51, secured to the switch housing 44, is provided with a rotatable drive shaft 52 having a splined stop collar 53 secured thereon for sliding engagement over the splined lower end of the piston rod 42, the stop collar having a wing 54 thereon for alternate engagement against stop members 56 and 57 provided with adjustable stop screws 58 and 59, respectively. The lower end of the anvil piston 34 is formed with a cylindrical bore 61 to receive a piston 62 secured to the piston rod 42.

Figure 10:
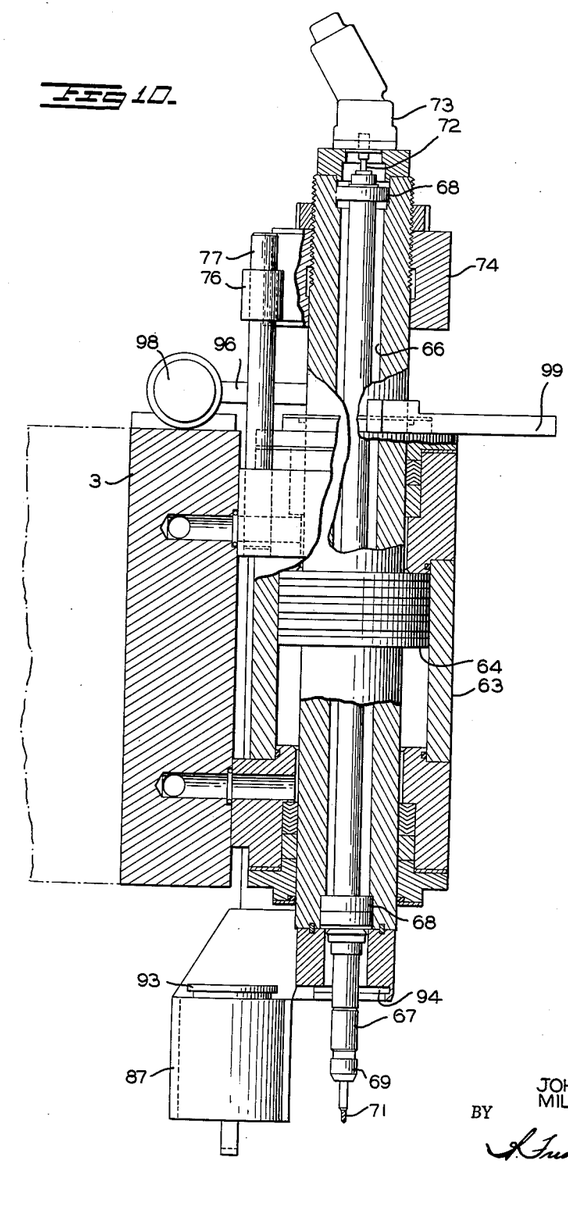
FIG. 10 is a vertical section illustrating the drilling and heading mechanism.

A cylinder 63 is provided on the upper head 3 to receive a piston 64 having an axial bore 66 to receive a drill spindle 67 journaled in anti-friction bearings 68—68. A suitable chuck 69 is mounted on the lower end of the drill spindle 67 to receive a combined drill and countersink 71, the upper end of the drill spindle being connected to the drive shaft 72 of a conventional electric or hydraulic motor 73. To prevent roational movement of the piston 64 a guide collar 74 is secured to the piston and formed with a bearing boss 76 to slidably receive a guide pin 77 fixed on the head 3.

A plurality of containers 78, each filled with rivet slugs S of a different length, are mounted on the frame 2 adjacent the upper head 3. The rivet slugs are of cylindrical form and are adapted to be dispensed from a selected container into a conduit 79 responsive to a material thickness sensing system which may be of the type disclosed in a co-pending application filed January 23, 1958, Ser. No. 710,705 by Filangeri et al., whereby rivet slugs of proper predetermined length are selected to suit the thickness of the material being riveted. As each rivet slug is dispensed from a container, a blast of air is directed through the conduit 79 to move the rivet slug into a feed trough 81 from which it is moved between a pair of spring fingers 82—82 (see FIG. 13) by means of a piston rod 83 actuated by a piston within an air cylinder 84. The spring fingers 82—82 are mounted upon a plate 86 guided for reciprocative movement on a heading plunger support 87 supported for pivotal movement on a shaft 88 journaled on the upper head 3.

Figure 14:
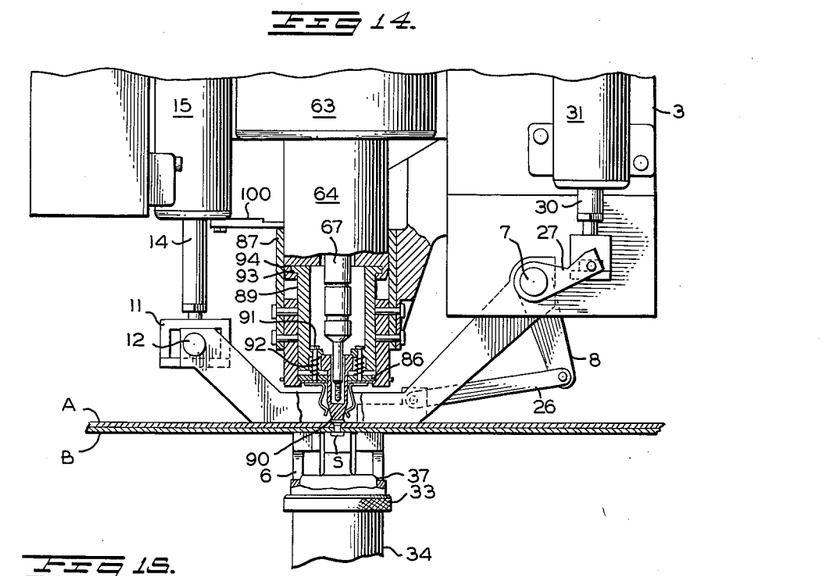
FIG. 14 is a view, corresponding to FIG. 13, showing the means for heading the slug.

A heading plunger 89 is mounted for reciprocative movement in the support 87 and has a heading boss 90 thereon to engage and upset the end of a rivet slug S. A plurality of screws 91 extend through apertures in the plunger 89 for threaded engagement in the plate 86, and compression springs 92 are mounted on the screws to yieldably resist movement of the plate toward the plunger. The upper end of the plunger 89 is formed with a flange 93 for engagement, during the heading operation, in a groove 94 formed in the lower end of the piston 64 as illustrated in FIG. 14. When the support 87 is retracted to its inoperative position, the plunger 89 is supported in its raised position by means of a plate 100 secured to the cylinder 15 and in sliding engagement under the plunger flange 93. It will be noted that the plate 86, support 87 and heading plunger 89 are formed with slots at 95 to receive the lower end of the drill spindle 67, chuck 69 and drill 71 when the plunger support 87 is pivoted to engage the heading plunger flange 93 in the piston groove 94. A bell crank lever 96 is secured to the upper end of the shaft 88 for engagement by a piston 97 mounted for reciprocative movement in a cylinder 98 mounted on the head 3. A stop arm 99 is secured to the lever 96 for sliding movement along the upper end of the cylinder 63 for engagement by the collar 74 to limit downward movement of the piston 64 during the drilling and heading operations, as hereinafter described.

The construction of supporting head 6 is illustrated in FIGURES 21 and 22. The supporting head has a cylindrical base 130 having an annular flange 131 adapted to be engaged by collar 33 for mounting on sleeve 32. A pair of symmetrically arranged members 132, 133 are integral with base 130. Members 132 and 133 consist of arc-shaped vertical portions 134, 135 and horizontally extending arms 136, 137, spaced apart to define a slot 138 in which anvil head 37 is vertically reciprocable. When the supporting head is moved upwardly arms 136 and 137 engage the workpiece to be riveted and clamp it against clamping arm 5.

Figures 12, 20:
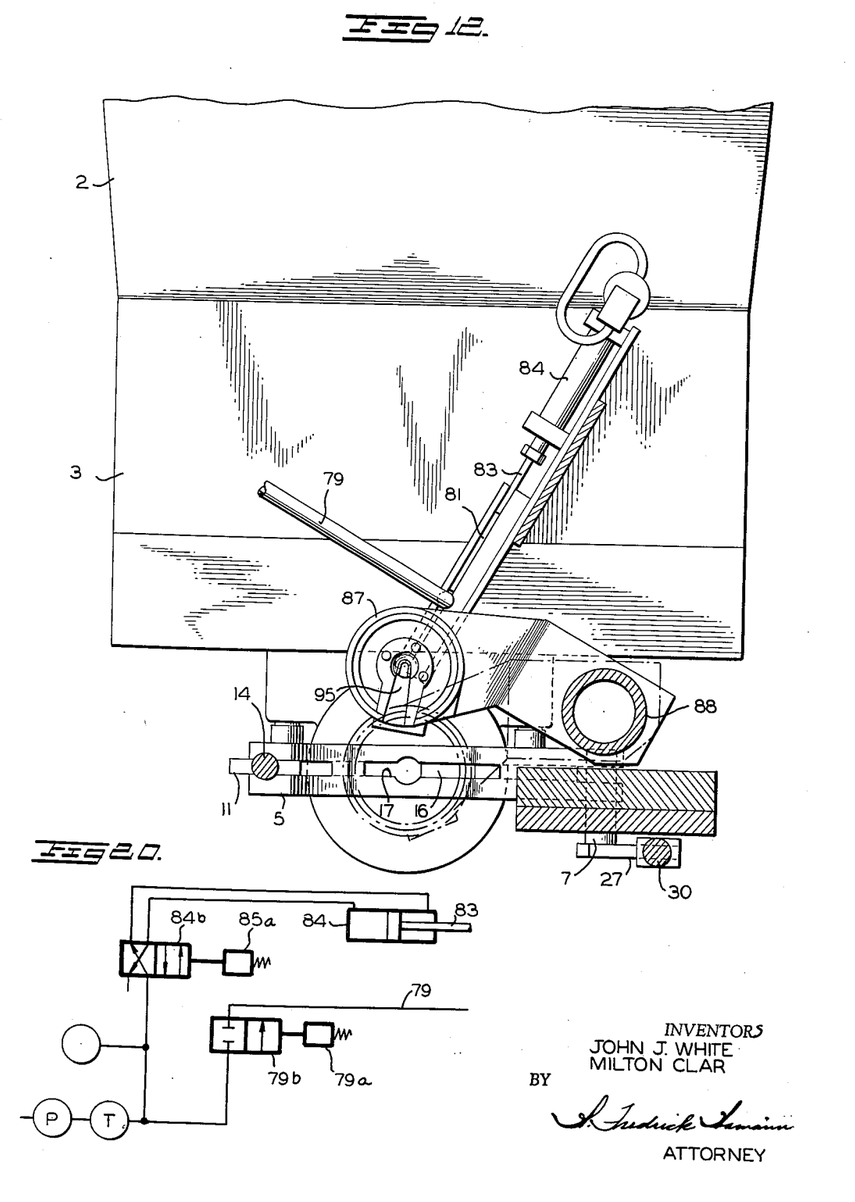
FIG. 12 is a transverse section, taken along the line 12—12 of FIG. 9, showing means for feeding a slug to a heading plunger support.
FIG. 20 is a schematic view illustrating the pneumatic rivet slug transfer system.
Figure 19:
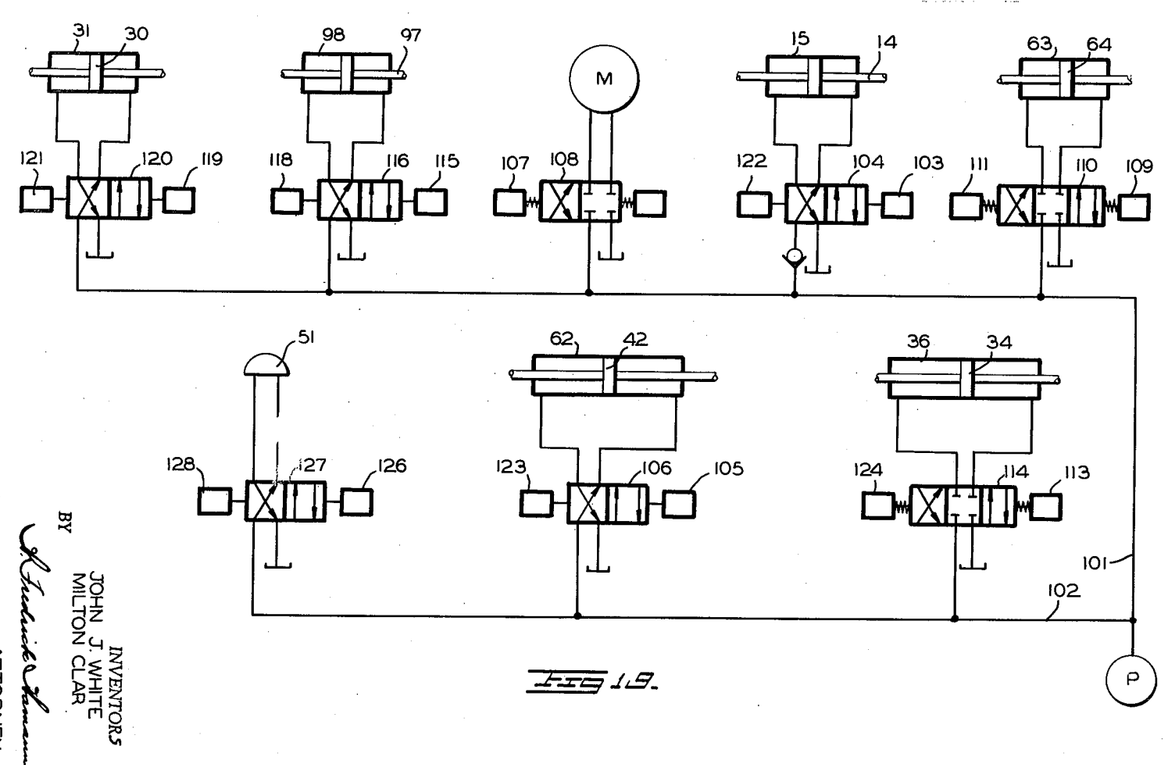
FIG. 19 is a schematic view illustrating the hydraulic system provided for selectively operating various parts of the machine.

In the operation of the machine thus shown and described, the several hydraulic motors are connected to a source of pressurized fluid, such as a pump P and conduits 101 and 102 under the control of solenoid actuated valves, as illustrated schematically in FIGS. 19 and 20. The several solenoids are adapted to be energized from a suitable source of current under the control of switches arranged in a circuit providing either manual or automatic control of the several steps in the riveting operation.

Figure 8:
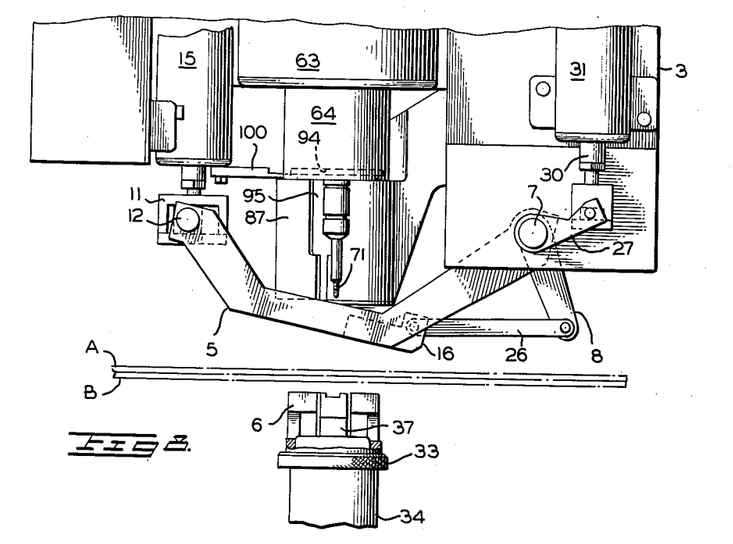
FIG. 8 is a fragmentary front elevation showing the supporting head and work clamping arm in their retracted positions.
Figure 9:
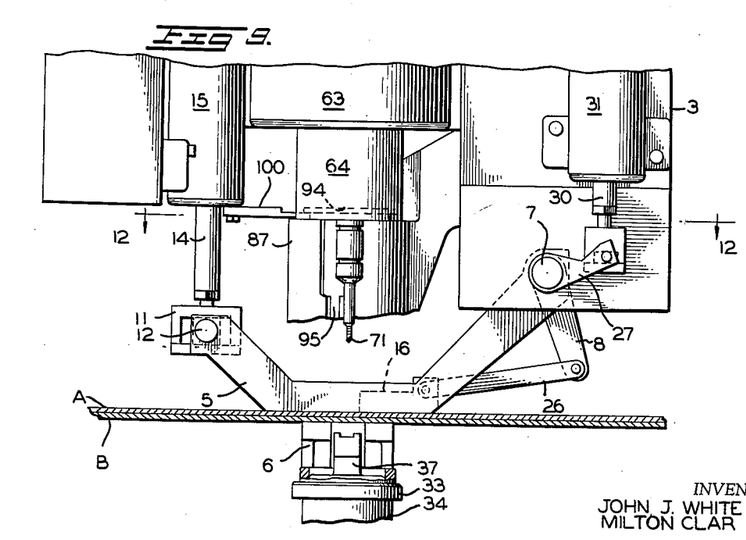
FIG. 9 is a view corresponding to FIG. 8 showing workpieces clamped between the snupporting head and work clamping arm.

To clamp the workpieces A and B in fixed position, the solenoid 103 is first energized to direct fluid through the valve 104 into the cylinder 15 to cause the piston 14 to move the work clamping arm 5 downwardly from its retracted postion, shown in FIG. 8, to its clamping position, shown in FIG. 9.

The solenoid 105 is then energized to direct fluid through valve 106 into cylinder 62 to move the piston rod 42 and supporting head 6 thereon upwardly into clamping engagement against the underside of the workpieces A and B, as illustrated in FIG. 9.

Figure 11:
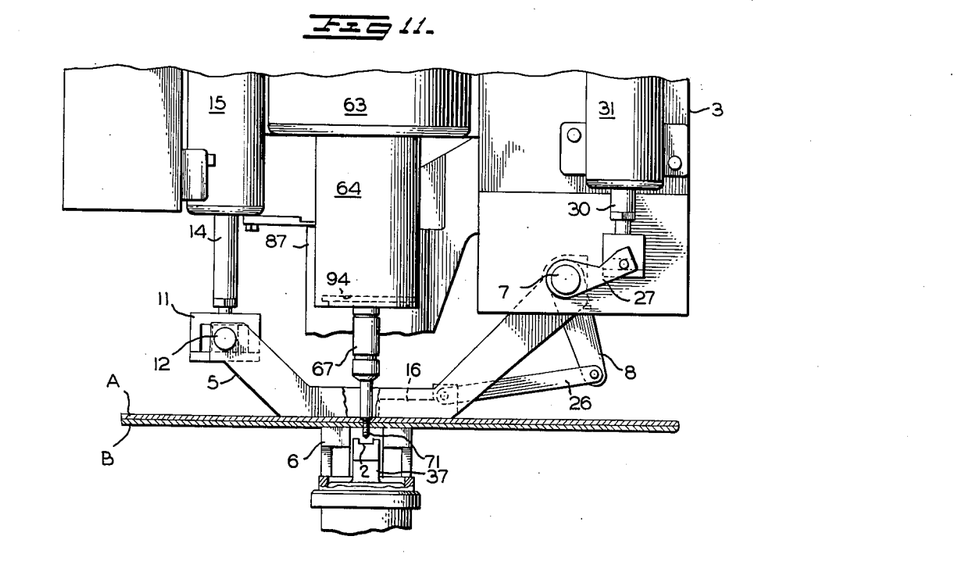
FIG. 11 is a fragmentary front elevation, corresponding to FIG. 9, showing the drill spindle lowered to drill and countersink the workpieces.

After the workpieces are thus clamped between the arm 5 and head 6 the solenoid 107 is energized to direct fluid through the valve 108 to the hydraulic motor 73 to rotate the drill spindle 67 and, simultaneous therewith, the solenoid 109 is energized to direct fluid through the valve 110 into one end of the cylinder 63 to cause the piston 64 to move the drill spindle 67 downwardly to drill and countersink a hole in the workpieces A and B, as illustrated in FIG. 11. After the hole has been drilled in the workpieces the solenoid 109 is de-energized and solenoid 111 is energized to direct fluid through the valve 110 into the other end of the cylinder 63 to cause the piston 64 to move the drill spindle 67 upwardly to its retracted position, as illustrated in FIG. 9.

Figure 13:
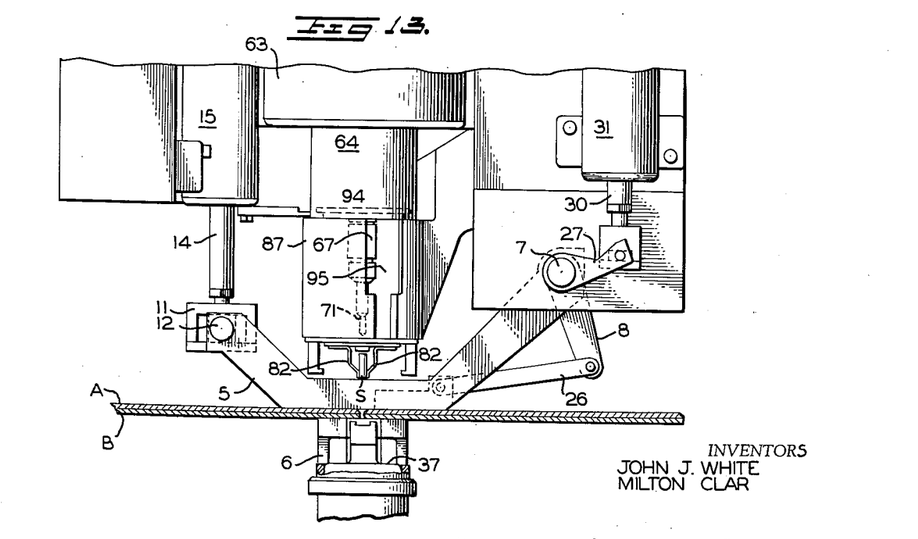
FIG. 13 is a view, corresponding to FIG. 9, showing the plunger support and slug moved into position for insertion of the slug into the hole drilled in the workpieces.

Upon engagement of the supporting head 6 against the workpieces, a rivet slug of proper length to suit the thickness of the workpieces is automatically selected and delivered from one of the containers 78 into the conduit 79, as disclosed in the pending application heretofore mentioned. The slug S is then transferred by a blast of air from a tank T through the conduit 79 into the ram groove 81 by energizing the solenoid 79a to open the valve 79b (see FIGS. 12 and 20). Air under pressure is then introduced into the cylinder 84 by means of the solenoid 84a and 84b to actuate the ram 83 to move the slug S into engagement between the resilient clamping fingers 82—82, as illustrated in FIG. 13. Upon selection of a slug of proper length for the workpieces, the solenoid 113 is energized to direct fluid through the valve 114 into the cylinder 36 to raise the piston 34 and anvil 37 to a predetermined distance from the worpieces as shown in FIG. 13; after which, a cam 47 opens a switch 46 to de-energize the solenoid 113 and close the valve 114.

After the workpieces have been drilled and the rivet slug S has been inserted between the resilient spring fingers 82, the heading plunger support 87 is pivoted from its retracted position, shown in FIG. 11, to its operative position shown in FIG. 13. By energizing the solenoid 115 fluid is directed through the valve 116 into the cylinder 98 which causes the piston 97 to rotate the lever 96 to pivot the heading plunger support 87 to its operative position in which the heading plunger boss 90, the piston 64, rivet slug S and rivet opening in the workpieces are disposed in axial alignment.

When the heading plunger support 87 is pivoted to its operative position, the heading plunger 89 is engaged to the piston 64 by movement of the flange 93 into the recess 94. By referring to FIG. 13, it will be noted that the slug S is disposed in axial alignment to the countersunk opening in the workpieces, and that the anvil 37 is spaced a predetermined distance from the underside of the workpieces. The slug S is then moved downwardly through the opening in the workpieces and into engagement against the anvil 37 by energizing the solenoid 109 to direct fluid through the valve 110 into the cylinder 63 to cause the piston 64 and heading plunger 89 to move downwardly. When the piston reaches a predetermined position in its downward movement a switch 117 on the head 3 is actuated by a cam 118 on the piston 64 to close a circuit to energize the solenoid 113 and direct fluid through valve 114 into the cylinder 36 to cause the anvil piston 34 to move upwardly. Opposite ends of the slug S are thus engaged between the heading plunger boss 90 and the anvil 37, and further movement of the boss and anvil toward each other serves to simultaneously form heads on opposite ends of the slug, as illustrated in FIG. 14. The slug engaging end of the anvil 37 is formed with a recess 2 which determines the shape and size of the rivet head to be formed therein.

After the slug has been headed, the solenoid 111 is energized to direct fluid through the valve 110 into the lower end of the cylinder 63 to raise the piston 64 and the heading plunger 89. The solenoid 118 is then energized to direct fluids through the valve 116 into the cylinder 98 to cause the piston 97 to pivot the lever 96 and heading plunger support 87 to their inoperative positions.

Figure 15:
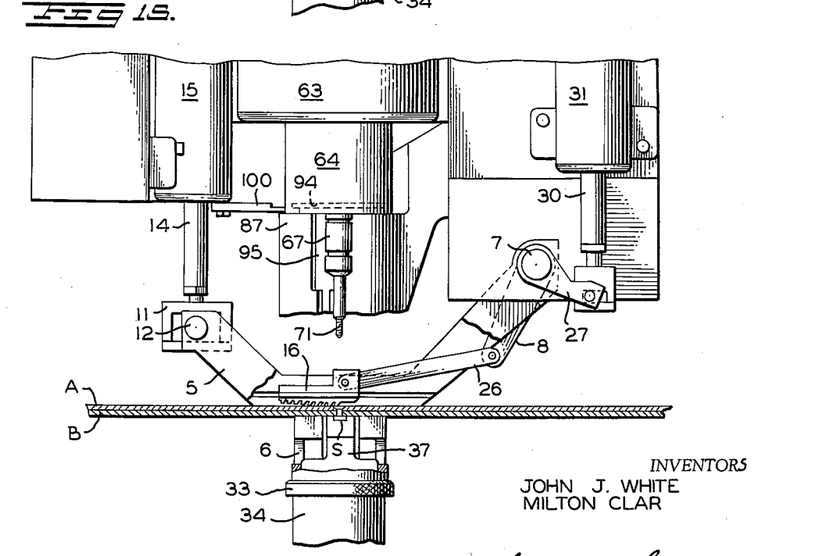
FIG. 15 is a view, corresponding to FIG. 9, showing means for trimming a rivet head.

After the heading operation, the upper head on the rivet projects above the upper surface of the workpiece A, as illustrated in FIG. 13. To trim the head of the rievt until it is flush with the upper surface of the workpiece A, a solenoid 119 is energized to direct fluid through the valve 120 into the cylinder 31 to cause the piston 30 to act through the lever 27, pin 7, lever 8, and connecting link 26 to move the cutter 16 across the head of the rivet to remove excess metal therefrom, as illustrated in FIG. 15. The cutter 16 is retracted by energizing the solenoid 121 to cause fluid to flow through the valve 120 into the lower end of the cylinder 31 to raise the piston 30 therein.

To release the workpieces from between the clamping arm 5 and the supporting head 6, the solenoid 122 is energized to direct fluid through the valve 104 into the cylinder 15 to raise the piston 14 and the end of the clamping arm attached thereto. The solenoid 123 is then energized to direct fluid through the valve 106 into the cylinder 62 to lower the piston 42 and the supporting head 6 thereon. The solenoid 124 is also energized to direct fluid through the valve 114 into the cylinder 36 to lower the piston 34 and the anvil 37 attached thereto.

To accommodate workpieces of different shapes, it is sometimes desirable to rotate the supporting head 6 and anvil 37 through an arc of 180°. This is accomplished by energizing the solenoid 126 to direct fluid through a valve 127 to the vane motor 51. To rotate the supporting head 6 and anvil 37 in the opposite direction, the solenoid 128 is energized to direct fluid to the opposite side of the vane of the vane motor 51.

While the machine is adapted for use in simultaneously heading opposite ends of straight rivet slugs, it is also adapted for use in heading one end of countersunk head rivets, or the like, by merely adjusting the position of the cam 118 relative to the switch 117 to cause the heading plunger boss 90 to engage the rivet head against the workpiece before the anvil acts to head the other end of the rivet.

While the invention has been shown in but one form, it is obvious to those skilled in the art that it is not so limited but is susceptible of various changes and modification without departing from the invention or the scope of the appended claims.

What is claimed is:

1. In a riveting machine, a movable work clamping arm, a reciprocable work supporting head rotatable for orientation and juxtaposed opposite to said work clamping arm and movable relative to said arm to clamp a workpiece therebetween, means for actuating said arm and head, means for forming a rivet opening in said workpiece, holding means for receiving and moving a headless rivet slug into alignment with said opening, a reciprocable anvil to engage a rivet positioned in said opening, said anvil being mounted adjacent said supporting head for rotation therewith, heading plunger means to transfer the rivet slug from the holding means into said opening to engage said anvil, means to move said anvil and heading plunger means toward each other to form heads simultaneously on opposite ends of the rivet slug, and means connected to said supporting head and anvil for imparting thereto common rotational movement and relative axial movement.

2. A riveting machine according to claim 1, wherein said last mentioned means moves said supporting head and anvil from a first predetermined angular position to a second predetermined angular position.

3. A riveting machine according to claim 2, wherein said supporting head includes a pair of spaced arms adapted to engage the work, said anvil being positioned between said arms.

References Cited in the file of this patent

UNITED STATES PATENTS

| | | |
|---|---|---|
| 68,680 | Adt | Sept. 10, 1867 |
| 545,756 | Adt | Sept. 3, 1895 |
| 826,496 | Einfeldt | July 17, 1906 |
| 1,144,297 | Chaplin | June 22, 1915 |
| 1,430,292 | Dicks | Sept. 26, 1922 |
| 1,906,595 | Hlava | May 2, 1933 |
| 2,204,537 | LaPointe | June 11, 1940 |
| 2,216,403 | Oeckl | Oct. 1, 1940 |
| 2,244,073 | Lyon | June 3, 1941 |
| 2,246,494 | Amiot | June 24, 1941 |
| 2,271,717 | Schwartz | Feb. 3, 1942 |
| 2,328,821 | Lyon | Sept. 7, 1943 |
| 2,356,526 | Mayer | Aug. 22, 1944 |
| 2,395,348 | Sherman | Feb. 19, 1946 |
| 2,488,645 | Speller | Nov. 22, 1949 |
| 2,620,876 | Harness | Dec. 9, 1952 |